United States Patent
Hipwell, Jr. et al.

(10) Patent No.: US 7,254,885 B2
(45) Date of Patent: Aug. 14, 2007

(54) WAFER-LEVEL FABRICATION METHOD FOR TOP OR SIDE SLIDER BOND PADS

(75) Inventors: Roger L. Hipwell, Jr., Eden Prairie, MN (US); Wayne A. Bonin, North Oak, MN (US); Kyle M. Bartholomew, St. Louis Park, MN (US); John R. Pendray, Edina, MN (US); Zine-Eddine Boutaghou, Vadnais Heights, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 303 days.

(21) Appl. No.: 10/263,891

(22) Filed: Oct. 3, 2002

(65) Prior Publication Data

US 2003/0161069 A1    Aug. 28, 2003

Related U.S. Application Data

(60) Provisional application No. 60/360,617, filed on Feb. 27, 2002.

(51) Int. Cl.
  *G11B 5/127* (2006.01)
  *H04R 31/00* (2006.01)

(52) U.S. Cl. ............................ 29/603.16; 29/603.11; 29/603.13; 29/603.15; 29/603.18; 29/417; 205/103; 205/105; 205/123; 216/39; 216/41; 216/48; 360/235.7; 360/235.8; 360/236.5; 360/237; 451/5; 451/41; 438/138

(58) Field of Classification Search ............ 29/603.07, 29/603.11, 603.13–603.16, 417; 205/103, 205/105, 123; 216/39, 41, 48; 360/121, 360/123, 126, 317, 235.7, 235.8, 236, 236.5, 360/237; 451/5, 41; 438/138
See application file for complete search history.

(56) References Cited

U.S. PATENT DOCUMENTS

| 5,276,573 | A | | 1/1994 | Harada et al. ............... 360/103 |
| 5,501,893 | A | | 3/1996 | Laermer et al. ............. 428/161 |
| 5,657,186 | A | | 8/1997 | Kudo et al. .................. 360/104 |
| 5,708,540 | A | * | 1/1998 | Ananth et al. ........... 360/235.4 |
| 5,770,465 | A | * | 6/1998 | MacDonald et al. ............ 216/2 |
| 6,074,896 | A | * | 6/2000 | Dando ......................... 438/114 |
| 6,140,674 | A | * | 10/2000 | Hause et al. ................. 257/301 |
| 6,344,949 | B1 | * | 2/2002 | Albrecht et al. ......... 360/236.5 |
| 6,524,461 | B2 | * | 2/2003 | Taylor et al. ............... 205/103 |

FOREIGN PATENT DOCUMENTS

JP    59185014 A  * 10/1984
JP    03034110 A  *  2/1991

OTHER PUBLICATIONS

"A novel trench planarization technique using polysilicon refill, polysilicon oxidation, and oxide etchback"; Shenai, K.; Electron Devices, IEEE Transactions on vol. 40, Issue 2, Feb. 1993; pp. 459-463.*

* cited by examiner

*Primary Examiner*—Paul D. Kim
(74) *Attorney, Agent, or Firm*—Kinney & Lange, P.A.

(57) ABSTRACT

A method is used for fabricating sliders for use in a disc drive actuation system, the sliders having bonds pads formed on either a top surface or side faces of the slider. The method comprises providing a substrate having a top surface. Trenches are formed in the substrate and filled with a bond pad material to form slider bond pads. Excess bond pad material is removed from the trenches such that the slider bond pads are flush with the top surface of the substrate. A transducer is fabricated on the top surface of the substrate. Finally, the slider bond pads are exposed.

22 Claims, 11 Drawing Sheets

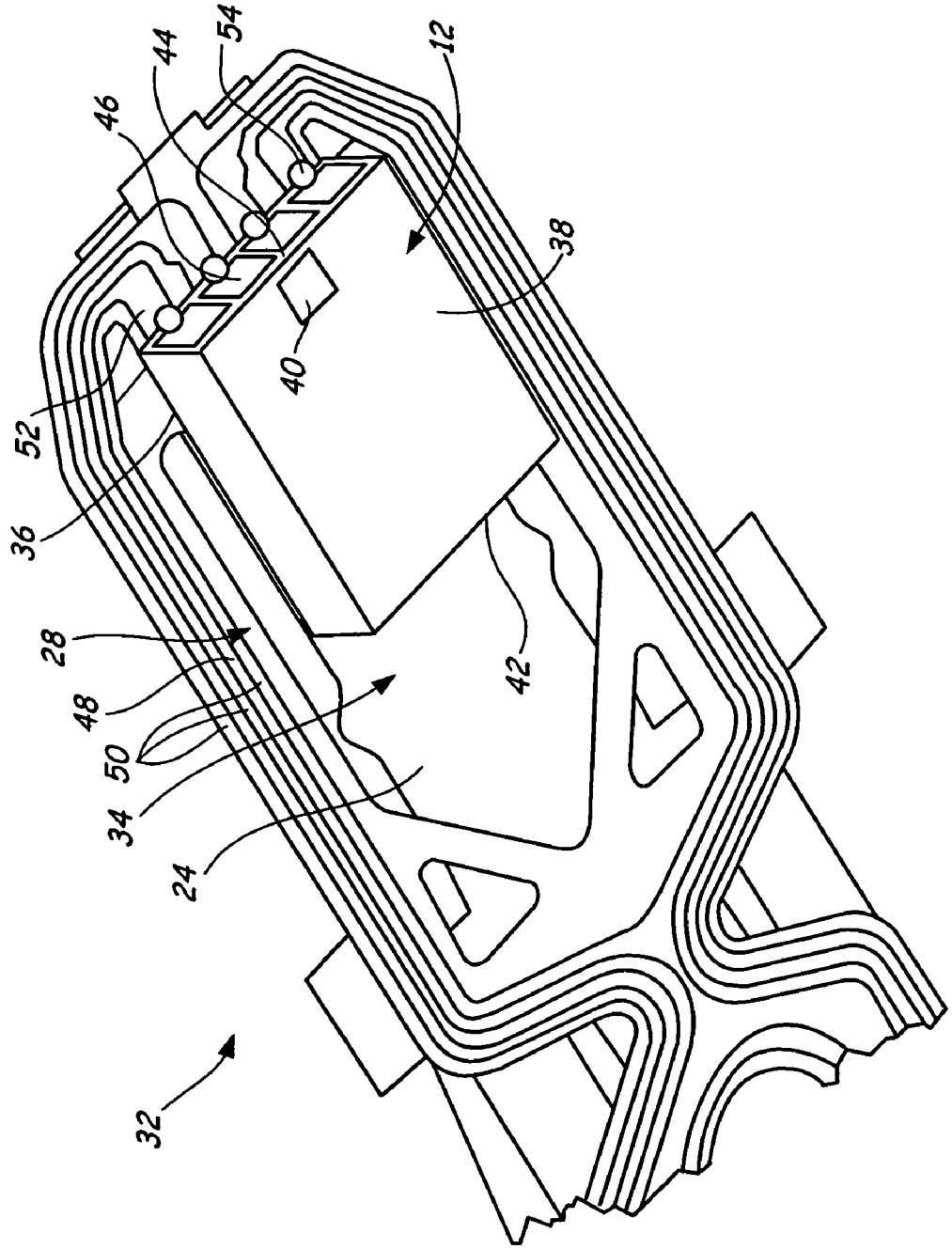

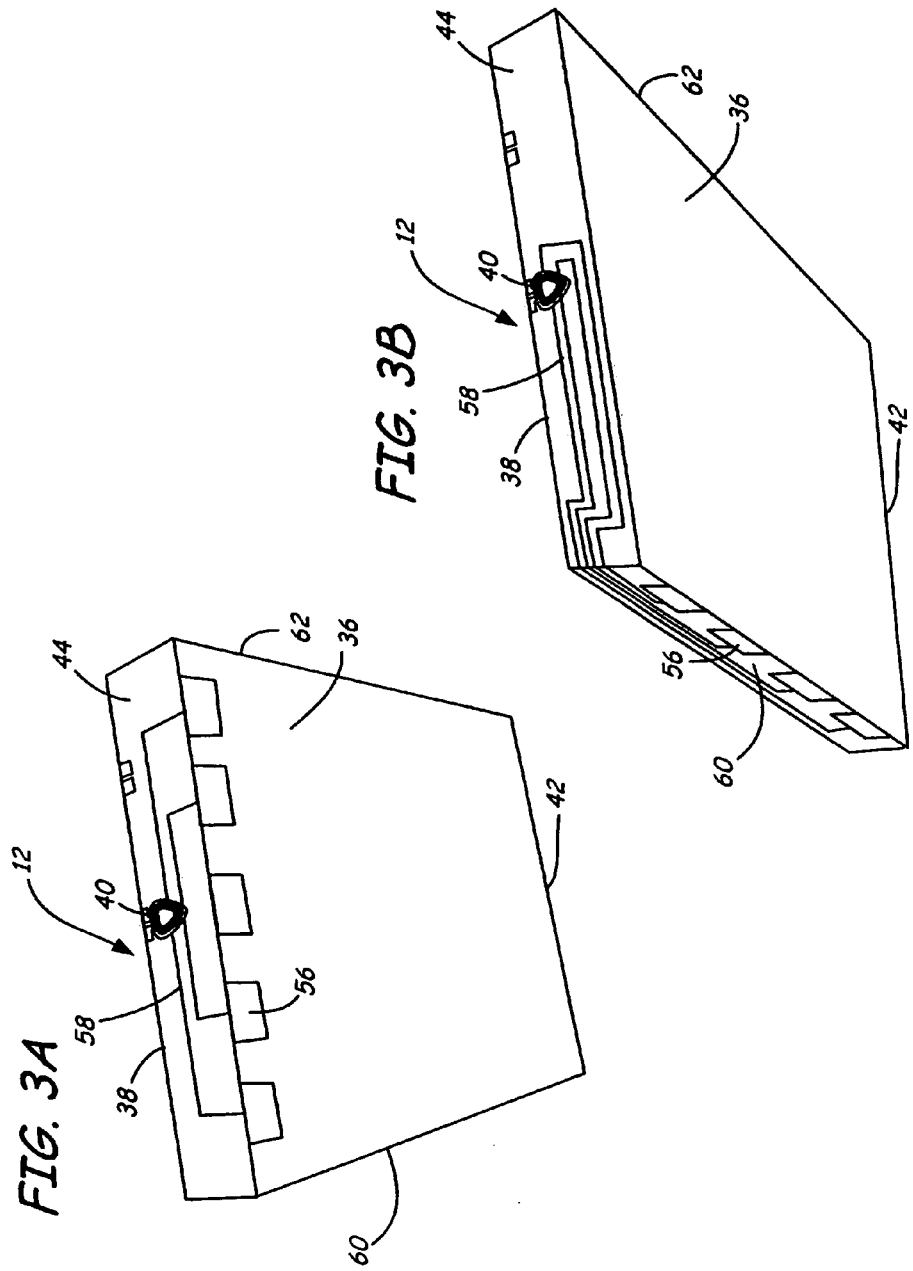

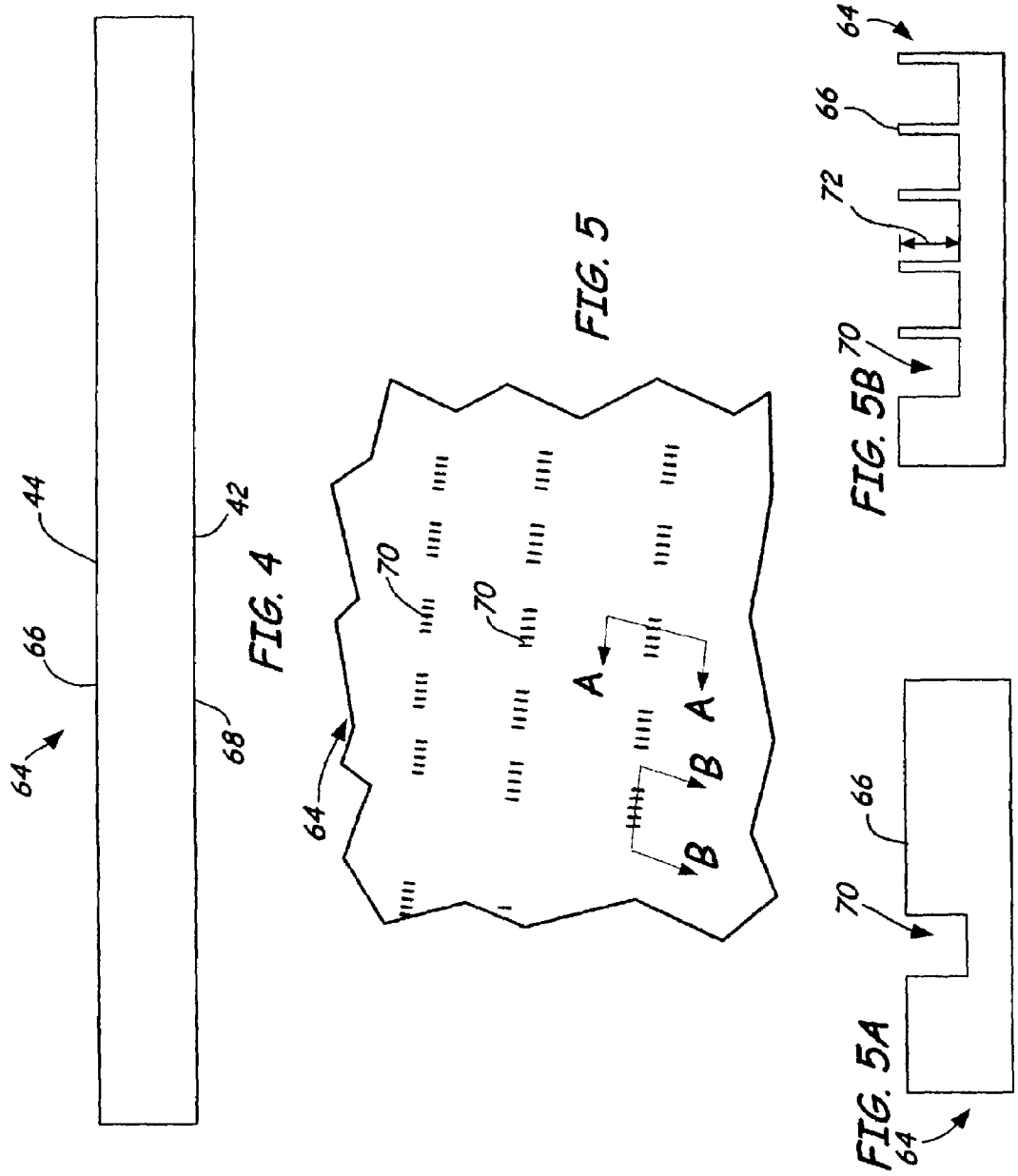

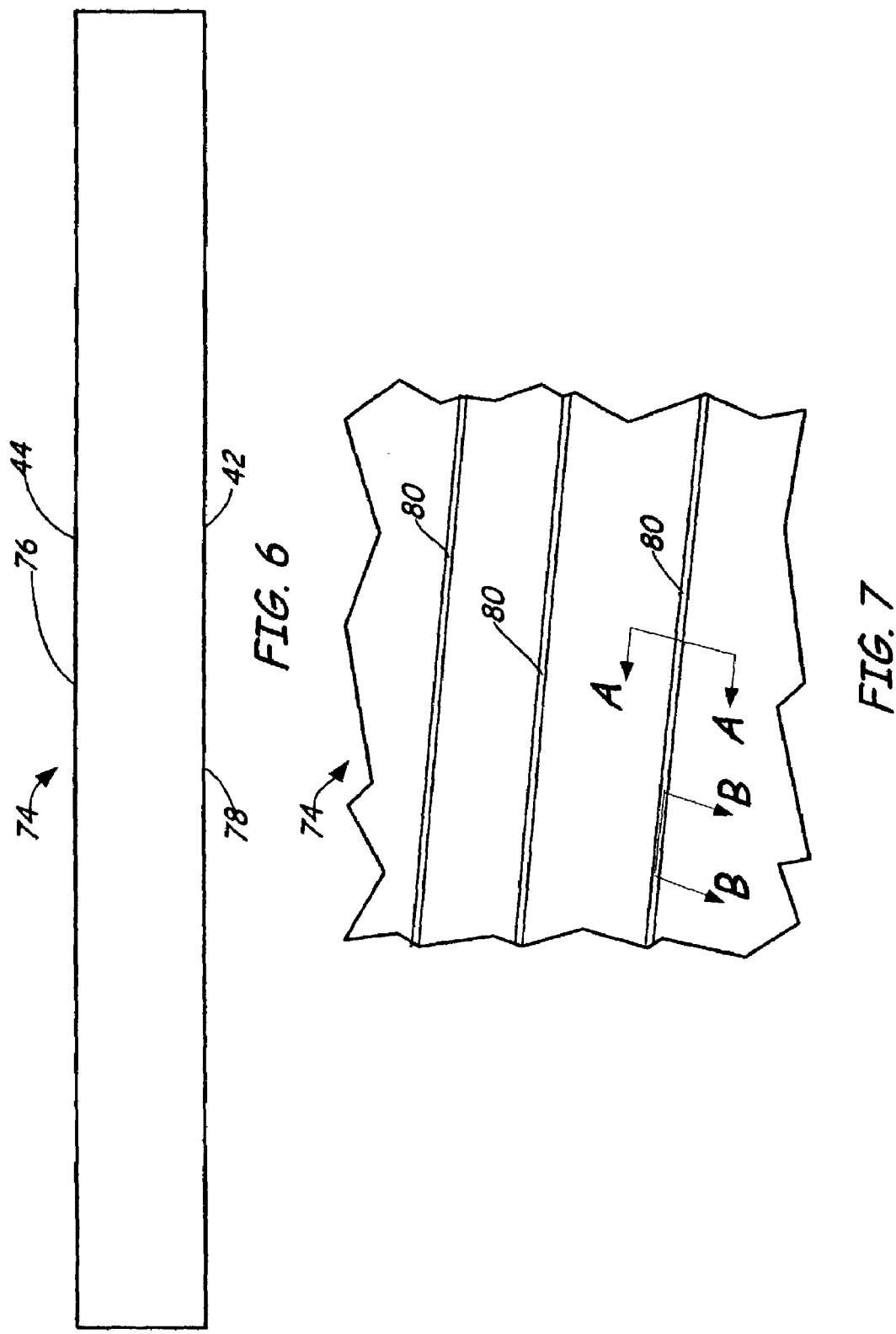

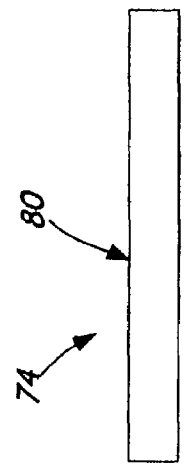
FIG. 7A
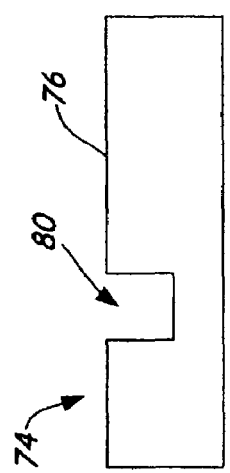
FIG. 7B
FIG. 8A
FIG. 8B
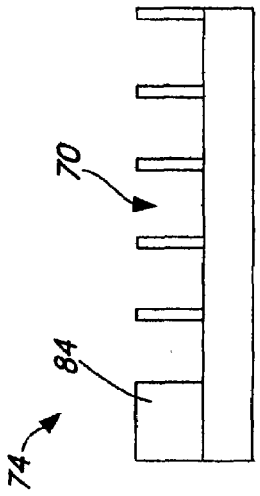
FIG. 9A
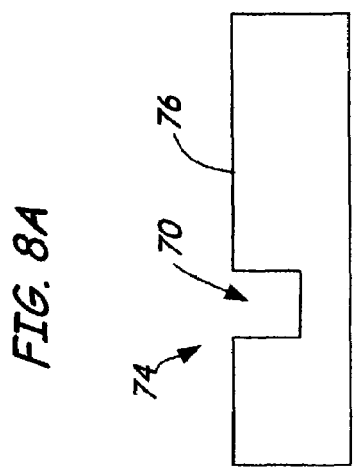
FIG. 9B

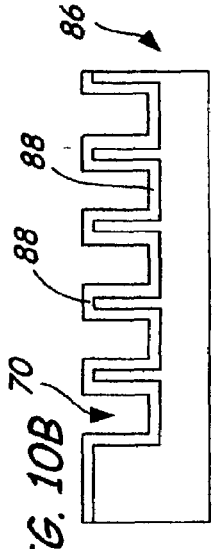
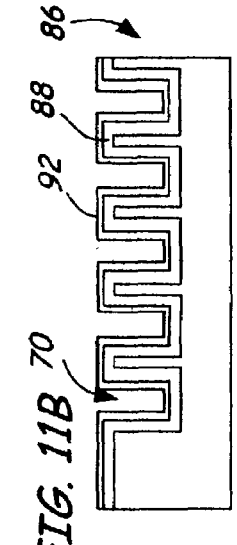
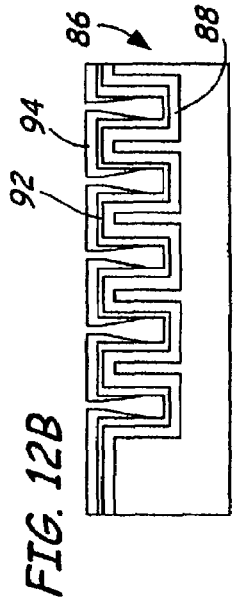
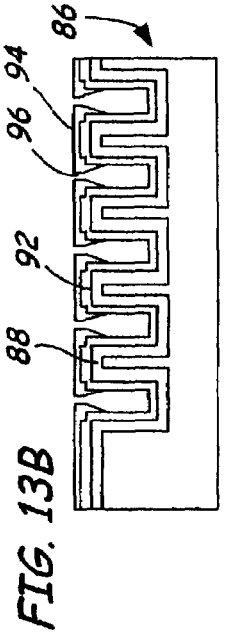
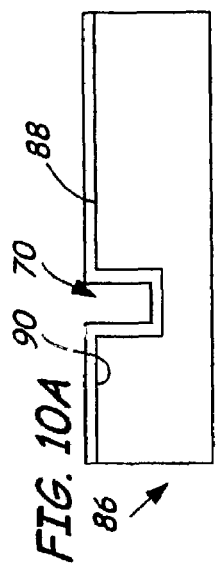
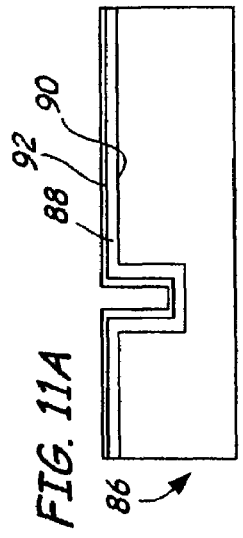
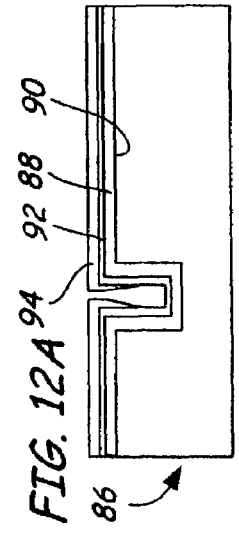
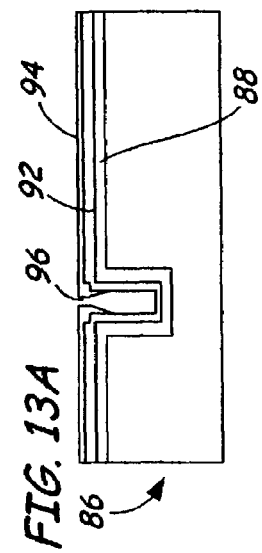

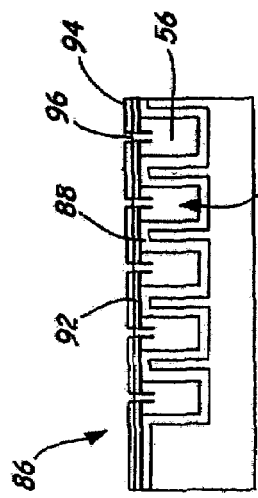
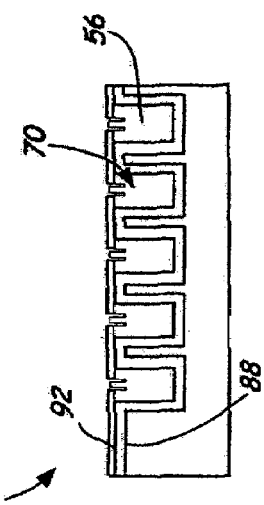
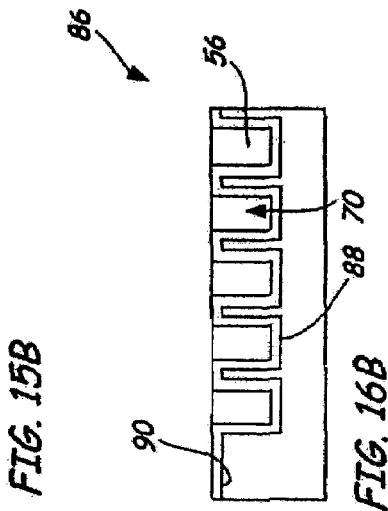
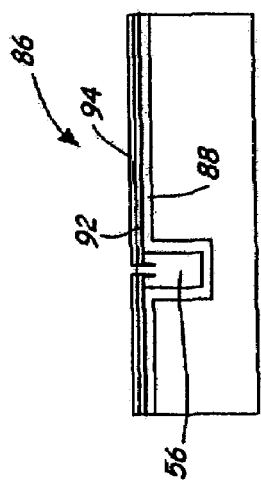
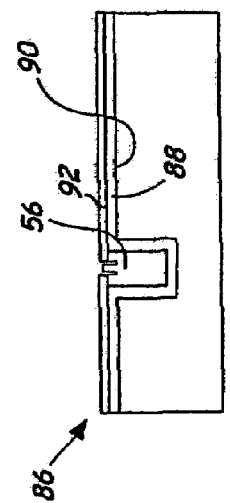
FIG. 14A  FIG. 14B
FIG. 15A  FIG. 15B
FIG. 16A  FIG. 16B

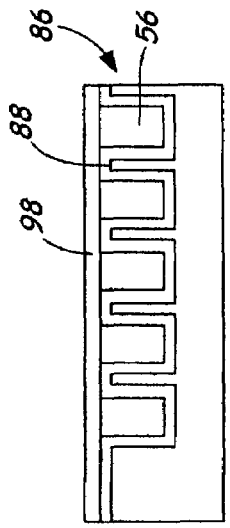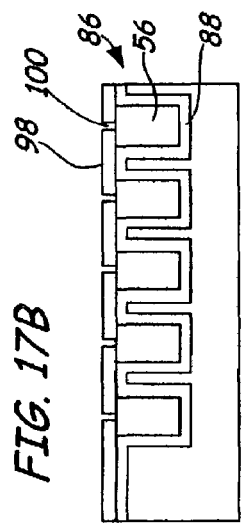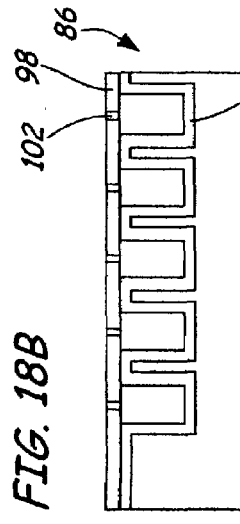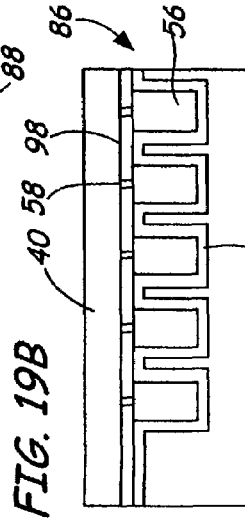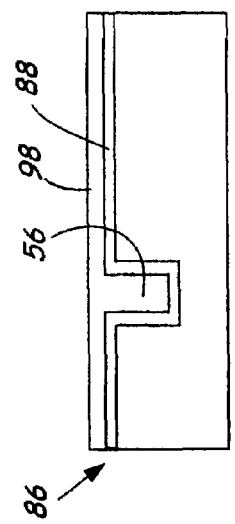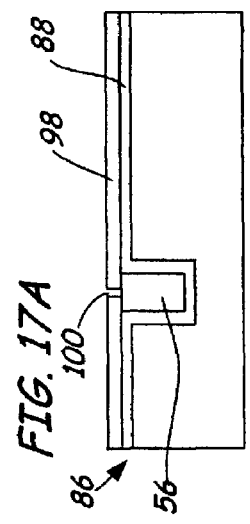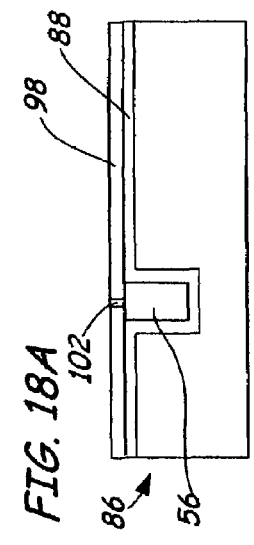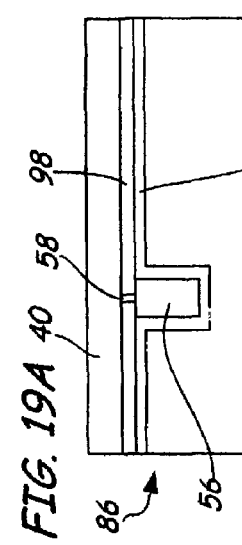

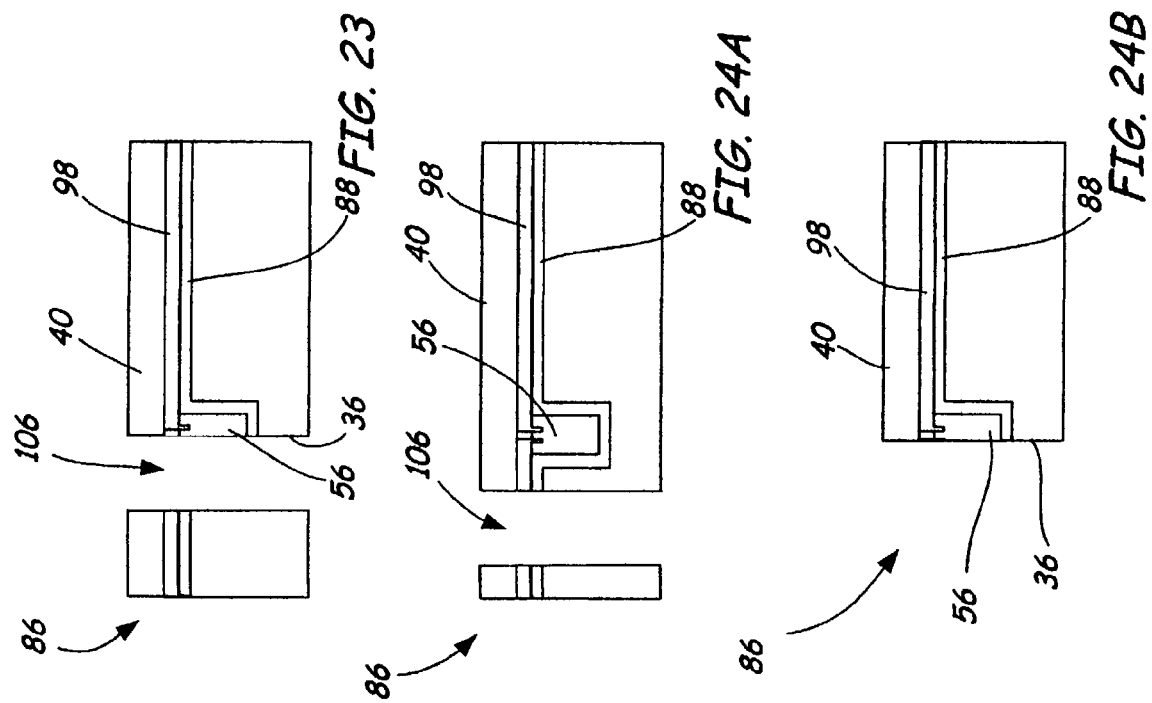

WAFER-LEVEL FABRICATION METHOD FOR TOP OR SIDE SLIDER BOND PADS

CROSS-REFERENCE TO RELATED APPLICATION(S)

This application claims priority from provisional application No. 60/360,617 filed Feb. 27, 2002, for "WAFER-LEVEL FABRICATION METHOD FOR TOP OR SIDE SLIDER BOND PADS" by Roger L. Hipwell, Wayne A. Bonin, Kyle M. Bartholomew, John R. Pendray and Zine-Eddine Boutaghou.

BACKGROUND OF THE INVENTION

The present invention relates to fabricating sliders for use in a disc drive actuation system. In particular, it relates to fabricating sliders with slider bond pads located along a top surface or sides of a slider body.

Air bearing sliders have been extensively used in disc drives to position a transducing head above a rotating disc. The transducing head is typically carried by the slider. Conventionally, head positioning is accomplished by operating an actuator arm with a large scale actuation motor, such as a voice coil motor (VCM), to easily position the slider over a track on a disc. Typically, disc drive systems include a suspension assembly attached to the actuator arm for supporting and positioning the slider. The suspension assembly includes a load beam attached to the actuator arm and a gimbal disposed at the opposite end of the load beam. The air bearing slider carrying the transducing head is mounted to the gimbal. This type of suspension assembly is used with both magnetic and nonmagnetic discs. The VCM rotates the actuator arm and the suspension assembly to position the transducing head over the desired radial track of the disc.

In order for the disc drive to read and write data from the transducing head, conductive traces are disposed along the suspension assembly for the disc drive to electrically communicate with the slider. The traces extend along the gimbal and end at flex on suspension (FOS) bond pads formed adjacent to the slider. Sliders typically used in disc drive systems have slider bond pads disposed on a trailing edge of the slider such that an electrical connection can be made between the traces and the slider. Typically gold bond balls are used to provide the connection between the FOS bond pads and the slider bond pads.

The slider bond pads are typically placed at the trailing edge of the slider because it is easier to access this part of the slider during wafer-level fabrication of sliders. However, difficulties have arisen with the current sliders using slider bond pads on the trailing edge, in particular with aligning the slider bond pads with the FOS bond pads of the suspension assembly. Misalignment of the two sets of bond pads degrades the connection between the FOS bond pads and the slider bond pads.

One alternative to forming the slider bond pads along the trailing edge of the slider is to place them on the top surface of the slider (opposite the air bearing surface). Top surface location of the bond pads improves the head gimbal assembly such that it is easier to align and connect the FOS bond pads with the slider bond pads, rather than matching up the FOS bond pads with the small, vertical surface of the trailing edge. In addition, there is more surface area on the top surface to locate and form the slider bond pads.

The slider body is typically formed during slider processing from a wafer comprised of a multi-layer substrate. Once the slider assembly features are fabricated, the substrate is sliced along slice lanes, or rows, into a plurality of slider bars. Each slider bar includes a plurality of individual sliders. The slider bars are cut along a plurality of dice lanes extending across the wafer substantially perpendicular to the slice lanes, to differentiate the individual slider bodies. Fabrication of the slider features, including the top surface slider bond pads, occurs at the bar-level after the substrate has been sliced into slider bars.

Some disc drive actuation systems include a microactuator to finely position the transducing head over a track of a disc. The density of concentric data tracks on magnetic discs continues to increase, requiring more precise radial positioning of the head. The VCM provides large scale movement of the transducing head, but lacks sufficient resolution to effectively accommodate high track density discs. Thus, a microactuator is used to finely position the transducing head and accommodate the more densely space tracks.

One design of a microactuator is transducer-level microactuator, which is built into a slider and moves the trailing edge of the slider carrying the transducing head. In transducer-level microactuators, an alternate position is need for the slider bond pads at a stationary portion of the slider. The trace cannot be bonded to a moving portion of the slider. Thus, top surface slider bond pads or bond pads located on a stationary portion of the slider are desired.

Fabrication of slider bond pads on the top surface of the slider is typically done at the bar-level, which is less efficient and more costly than wafer-level fabrication processes. A method is needed in the art for fabricating sliders having slider bond pads on the top surface, or an alternative surface besides the trailing edge of the slider. The method should be efficient and cost effective, and preferably a wafer-level fabrication process.

BRIEF SUMMARY OF THE INVENTION

The present invention relates to a method for fabricating sliders for use in a disc drive actuation system, the sliders having bonds pads formed on either a top surface or side faces of the slider. The method comprises providing a substrate having a top surface. Trenches are formed in the substrate and filled with a bond pad material to form slider bond pads. Excess bond pad material is removed from the trenches such that the slider bond pads are flush with the top surface of the substrate. A transducer is fabricated on the top surface of the substrate. Finally, the slider bond pads are exposed.

BRIEF DESCRIPTION OF THE DRAWINGS

FIG. 2 is a perspective view of a disc opposing surface of the distal end portion of a typical actuation assembly.

FIG. 3A is a perspective view of a slider of the present invention having top slider bond pads.

FIG. 3B is a perspective view of a slider of the present invention having side slider bond pads.

FIG. 4 is a sectional view of a silicon wafer for forming sliders.

FIG. 5 is a top perspective view of the silicon wafer.

FIG. 5A is a sectional view of the silicon wafer taken along line A-A of FIG. 5 and FIG. 5B is a sectional view of the silicon wafer taken along line B-B of FIG. 5.

FIG. 6 is a sectional view of a non-silicon wafer for forming sliders.

FIG. 7 is a top perspective view of the non-silicon wafer.

FIGS. 7A and 7B through FIGS. 9A through 9B are sectional views of the non-silicon wafer taken along lines A-A and B-B of FIG. 7 illustrating various stages of a process flow for forming the bond pad molds in the wafer.

FIGS. 10A and 10B through 20A and 20B are sectional views of a substrate taken along lines A-A and B-B illustrating various stages of the process flow for forming the slider.

FIG. 23 is a sectional view of the wafer along line A-A of FIG. 22 illustrating a first method for exposing the bond pads.

FIGS. 24A and 24B are sectional views of the substrate along line A-A of FIG. 22 illustrating a second method for exposing the bond pads.

DETAILED DESCRIPTION

Figure 1:
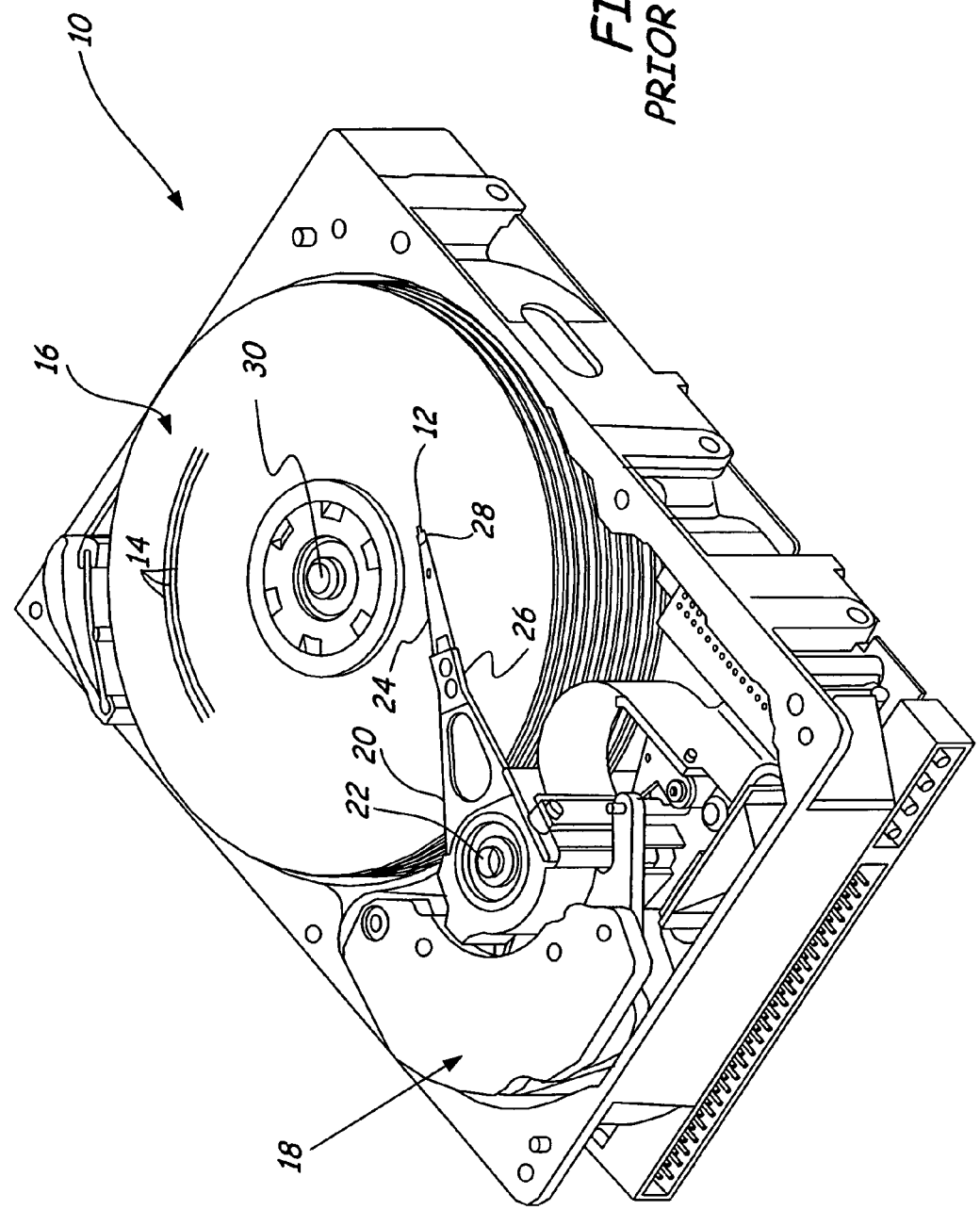
FIG. 1 is a perspective view of a conventional disc drive actuation system for positioning a slider over a track of a disc.

FIG. 1 is a perspective view of a disc drive actuation system 10 for positioning a slider 12 over a track 14 of a disc 16. Actuation system 10 includes voice coil motor (VCM) 18 arranged to actuate an actuator arm 20 on a spindle around an axis 22. A head suspension 24, or load beam, is connected to actuator arm 20 of a head mounting block 26. A flexure 28, or gimbal, is connected to an end of head suspension 24, and carries slider 12. Slider 12 carries a transducing head (not shown in FIG. 1) for reading and/or writing data on concentric tracks 14 of disc 16. Disc 16 rotates around an axis 30, so that windage is encountered by slider 12 to keep it aloft a small distance above the surface of disc 16.

FIG. 2 is a perspective view of a disc opposing surface of a distal end portion of an actuation assembly 32. Actuation assembly 32 is comprised of actuator arm 20 (shown in FIG. 1) with load beam 24 connected to actuator arm 20 (shown in FIG. 1) at head mounting block 26 (shown in FIG. 1). Gimbal 28 is connected to a distal end 34 of load beam 24 and slider 12 is attached to gimbal 28.

This is a view of a conventional slider 12 attached to actuation assembly 32. Slider 12 has a gimbal opposing face 36, or top surface, which is attached to gimbal 28. Slider 12 also has an air bearing surface 38, or disc opposing face, carrying a transducing head 40 which faces disc 16 to read and write data from disc 16. In addition, slider 12 has a leading edge 42 and an opposite trailing edge 44 which extend between top surface 36 and air bearing surface 38 of slider 12. In a conventional slider, slider bond pads 46 are located along trailing edge 44 of slider 12.

In a typical actuation assembly 32, flex circuit material 48 is disposed along the underside of gimbal 28, load beam 24 and along the length of actuator arm 20 all the way to the circuitry located in another part of the disc drive (not shown). A trace layer 50 is disposed upon flex circuit material 48 and completes a circuit connection between the electrical components of the disc drive (not shown) and transducing head 40 carried by slider 12. Trace layer 50 travels along the underside of gimbal 28, load beam 24 and along the length of actuator arm 20. Each trace 50 ends at a flex on suspension (FOS) bond pad 52. In an exemplary embodiment, there is at least one FOS bond pad 52 located on gimbal 28 for each slider bond pad 46 located on slider 12. A gold ball bond 54 is disposed on each slider bond pad 46 and its respective FOS bond pad 52 to create an electrical connection between slider 12 and trace layer 50. Ball bonds 54 act as a electrical conduit and complete the electrical connection between slider 12 and trace layer 50.

FIG. 3A is a perspective view of slider 12 of the present invention having slider bond pads 56 located on a top surface 36 of slider 12. Slider 12 has the air bearing surface 38, or disc opposing face, and top surface 36 extending between leading edge 42 and trailing edge 44. Top surface 36 is typically attached to actuation assembly 32 such that air bearing surface 38 faces disc 16 to allow transducer 40 to read and write data from disc 16. Slider bond pads 56 are formed on top surface 36 of slider 12, adjacent trailing edge 44. During fabrication of slider 12, interconnects 58 are formed between slider bond pads 56 and transducing head 40.

The present invention slider 12 is preferably attached to actuation assembly 32, in particular gimbal 28, along top surface 36. Slider bond pads 56 are aligned and connected to FOS bond pads 52 to provide an electrical interconnect between the disc drive and slider 12. Location of slider bond pads 56 along top surface 36 of slider 12 allows for easier and quicker alignment of slider bond pads 56 with FOS bond pads 52, and offers more space for the location of slider bond pads 56 than along the narrow trailing edge 44.

Slider 12 extends laterally between a first side face 60 and a second side face 62. In an alternate embodiment of the present invention, shown in FIG. 3B, slider bond pads 56 may be formed along either first side face 60, second side face 62, or both. Location of bond pads 56 along side faces 60, 62 of slider 12 permits possible connection between slider 12 and FOS bond pads 52, interconnects for other sensors, or additional contacts where side bonding is preferred. Although the fabrication process discussed below illustrates forming slider bond pads 56 on top surface 36 of slider 12, the same process is applicable for forming slider bond pads 56 on side faces 60, 62 of slider 12.

Sliders are preferably manufactured in multiple quantities from a substrate, or wafer. The present invention slider 12 may be formed from a silicon wafer or a non-silicon wafer. FIG. 4 is a sectional view of a silicon wafer 64 for forming sliders 12. Wafer 64 has a top surface 66 which forms trailing edge 44 of the slider 12 and a bottom surface 68 which forms leading edge 42 of slider 12. Wafer 64 is preferably formed of a silicon substrate and has in some embodiments additional coatings (not shown here) on top surface 66.

FIG. 5 is a top perspective view of silicon wafer 64 with a plurality of bond pad molds 70, or trenches, formed in top surface 66 of wafer 64. FIG. 5A is a sectional view of silicon wafer 64 taken along line A-A FIG. 5 and FIG. 5B is a sectional view of silicon wafer 64 taken along line B-B of FIG. 5. Cross section A-A runs substantially perpendicular to a slicing lane through bond pad molds 70. Cross section B-B runs along a slicing lane through all bond pad molds 70 and is substantially parallel to air bearing surface 38 of sliders 12.

FIGS. 5A and 5B show bond pad molds 70 formed in top surface 66 of wafer 64. In one embodiment of the present invention, bond pad molds 70 are etched into wafer 64 using deep reactive ion etching (DRIE). A resist or oxide mask may be used to facilitate etching. Bond pad molds 70 have a depth 72 between about 50 microns and about 75 microns. Depth 72 of trenches 70 determines a length of slider bond pads 56 once they are formed. Although not shown in FIGS. 5A and 5B, extra slots or trenches may be formed away from the bond surface to increase the adhesion of bond pad metal to silicon wafer 64 during bar slicing.

FIG. 6 is a sectional view of a non-silicon wafer 74 for forming sliders 12. Wafer 74 has a top surface 76 which forms trailing edge 44 of sliders 12 and a bottom surface 78 with forms leading edge 42 of sliders 12. In one embodiment of the present invention, non-silicon wafer 74 is formed of a AlTiC substrate and may have additional coatings (not shown) on top surface 76. Non-silicon wafers 74, especially AlTiC wafers, require a different fabrication process for forming trenches 70, or bond pad molds, in top surface 76 of wafer 74.

FIG. 7 is a top perspective view of non-silicon wafer 74, with dice lanes 80 formed in wafer 74 for fabricating bond pad molds 70. FIGS. 7A-9B are sectional views of non-silicon wafer 74 illustrating the fabrication process for forming bond pad molds 70 in non-silicon wafer 74, taken along lines A-A, and B-B of FIG. 7. FIGS. 7A and 7B show dice lanes 80 formed in top surface 76 of wafer 74. Dice lanes 80 are preferably cut partially into wafer 74 utilizing a dicing saw. A depth 82 of dice lanes 80 is about 50 microns and about 75 microns. Depth 82 of the cut to form dice lanes 80 translates into the length of slider bond pads 56.

FIGS. 8A and 8B show dice lanes 80 formed with the dicing saw back filled with a spacer material 84. Spacer material 84 is preferably a patternable or etchable material, such as photoresist, photoimageable epoxy (e.g. SU8 photoimageable epoxy), spin on glass, polysilicon, or geranium. It is difficult to etch the AlTiC material, thus cutting and backfilling of space material 84 is used prior to forming bond pad molds 70 to provide an etchable material.

FIGS. 9A and 9B show bond pad molds 70 formed in spacer material 84 of non-silicon wafer 74. Spacer material 84 is patterned either directly or indirectly to form bond pad molds 70. Spacer material 84 should be cured. For example, if a photoimageable epoxy or resist is used as spacer material 84, bond pad molds 70 can be directly patterned with a photomask. In an example of indirectly patterning bond pad molds 70, polysilicon is inserted into the dice lanes to provide an etchable spacer material that can be photopatterned and DRIE etched. One embodiment uses the Bosch DRIE process to etch bond pad molds 70 into silicon wafer 64, which is further described in U.S. Pat. No. 5,501,893 by Laermer et al. In either the indirect or direct patterning example, surface material may be removed off the top surface by either a damascene chemical mechanical planarization (CMP) process, lithographically, blanket etch or dry etch.

FIGS. 10A-20B are sectional views of a substrate 86, or wafer with bond pad molds illustrating various stages of the fabrication process for forming sliders 12. Whether a silicon or a non-silicon wafer is used, the remaining steps after forming bond pad molds 70 are identical, thus, a single set of figures is shown for these steps. The "A" figures are sectional views of wafer 86 taken along line A-A of FIGS. 5 and 7 and the "B" figures are taken along the lines of B-B of FIGS. 5 and 7.

FIGS. 10A and 10B show bond pad molds 70 insulated. A first insulation layer 88 is deposited in bond pad molds 70 and along a top surface 90 of wafer 86. One type of insulation 88 used is a low-pressure chemical vapor deposition (LPCVD) silicon nitride, which provides good conformality and resistivity during fabrication. Insulation layer 88 coats all surfaces equally.

FIGS. 11A and 11B show a conductive seedlayer 92, or bond pad material, deposited on top surface 90 of first insulation layer 88. Conductive seedlayer 92 is used for electroplating slider bond pads 56 and forms slider bond pads 56. Conductive seedlayer 92 is preferably a metal material, which provides good adhesion and conductivity, such as tantalum or gold.

FIGS. 12A and 12B show a non-conformal (or second) insulation layer 94 deposited on top of conductive seedlayer 92. One type of insulation 94 used is a plasma enhanced CVD (PECVD) silicon dioxide. Non-conformal insulation layer 94 serves as an electrical insulator covering bond pad molds 70 and conductive seedlayer 92 so that additional metalization and processing can be done without shorting. PECVD is preferred because it is low temperature and a conformal deposition is not needed.

FIGS. 13A and 13B show non-conformal insulation layer 94 etched to create interconnect vias 96 from top surface 90 of wafer 86 to bond pad molds 70. Insulation layer 94 is isotopically etched to ensure the conductive surfaces of slider bond pads 56, once formed, are exposed. Either a timed wet etch or dry etch is used to form vias 96, although other processes may be used as known in the art.

FIGS. 14A and 14B show slider bond pads 56 formed in the wafer 86. Conducive seedlayer 92 is electroplated to fill bond pad molds 70 and interconnect vias 96 with the conductive metal material 92. Conductive seedlayer 92 may "mushroom" or expand over top surface 90 of wafer 86. The depth of bond pad molds 70 is preferably between about 50 microns to about 75 microns. This depth range results in pads 56 long enough to provide a good connection, but not too deep to inhibit etching. Trenches 70 may also be filled to form sliderbond pads 56 by a number of methods, including, but not limited to, blanket plating, selectively plating the mold, sputtering, or chemical vapor deposition (CVD).

FIGS. 15A and 15B show second insulation layer 94 removed from top surface 90 of wafer 86. Preferably, second insulation layer 94 is removed using a wet or dry isotropic process. FIGS. 16A and 16B show conductive seedlayer 92, or slider bond pads 56, planarizied to top surface 90 of wafer 86. A lapping or CMP process is preferably used to planarize bond pads 56 to top surface 90 of wafer 86, such that slider bond pads 56 are flush with top surface 90. Top surface 90 is then cleaned prior to the remaining fabrication processing steps.

FIGS. 17A and 17B show a third insulation layer 98 deposited on top of slider bond pads 56 and top surface 90 of wafer 86. In one embodiment a PECVD silicon nitride is used for insulation layer 98. FIGS. 18A and 18B show electrical vias 100 etched through third insulation layer 98. Electrical vias 100 interconnect slider bond pads 56 to the transducer (not shown) fabricated on top surface 90 of wafer 86. Electrical vias 100 are preferably etched into insulation layer 98 using a standard photolithography and dry etching process.

FIGS. 19A and 19B show interconnect material 102 deposited in electrical vias 100. Interconnect material 102 is typically a conductive metal. Interconnect material 102 forms interconnects 58 between slider bond pads 56 and the transducer (not shown).

FIGS. 20A and 20B show read/write transducer 40 fabricated on top surface 90 of wafer 86. The geometry and layers of transducer 40 are not shown in detail as the process used to form the transducer is one typically known in the art.

Figure 21:
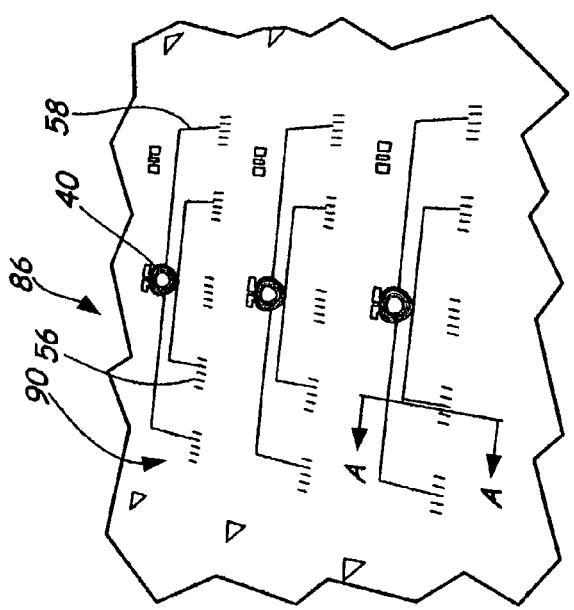
FIG. 21 is a top perspective view of the substrate showing transducers fabricated on the top surface.
Figure 22:
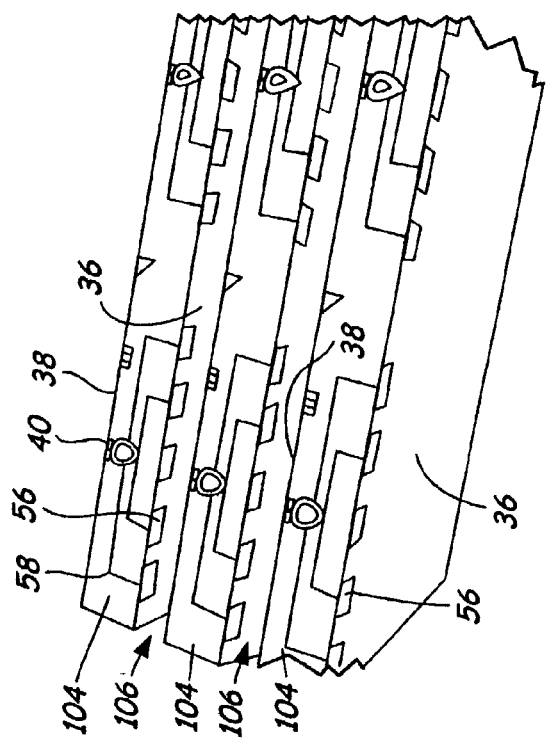
FIG. 22 is a top perspective view of the substrate diced into a plurality of slider bars.

FIG. 21 is a top perspective view of substrate 86 showing transducers 40 fabricated on top surface 90. Top surface 90 forms trailing edge 44 of sliders 12. FIG. 22 is a top perspective view of substrate 86 sliced into a plurality of slider bars 104. Slicing substrate 86 into slider bars 104 exposes slider bond pads 56 formed in substrate 86 along top surface 36 of sliders 12 and transducing head 40 along air bearing surface 38 of sliders 12.

Wafer 86 is sliced along slicing lanes 106 extending laterally across wafer 86. Slicing wafer 86 into slider bars 104 also exposes top surface 36 and air bearing surface 38 of sliders 12. There are two different methods used to expose top slider bond pads 56 during bar slicing, direct dicing to pads 56 and a dice and lap process to pads 56.

FIG. 23 shows a sectional view of substrate 86 along line A-A of FIG. 21, in which direct dicing was used to expose slider bond pads 56. In the direct dicing process, a dicing wheel, or saw, slices wafer 86 into slider bars 104. The dicing wheel passes through slicing lanes 106 extending across wafer 86, which pass through slider bond pads 56. Direct dicing exposes the slider bond pad surfaces.

FIGS. 24A and 24B are sectional views of substrate 86 taken along line A-A of FIG. 21, which illustrate the dice and lap process for exposing slider bond pads 56. First, wafer 86 is sliced into slider bars 104 using a dicing wheel along slicing lanes 106 extending along wafer 86. Slicing lanes 106 are substantially parallel to slider bond pads 56, but do not pass through bond pads 56. Thus, when wafer 86 is sliced into slider bars 104, slider bond pads 56 are not exposed and a small amount of wafer material and first insulation layer 88 remain between slicing lane 106 and slider bond pads 56. In a second step, the silicon and insulation layer are removed by bar-level mechanical lapping. Slider bars 104 are then diced along dicing lanes into individual sliders 12.

The present invention is a method for fabricating slider bond pads on the top surface or side faces of the slider. The same fabrication process described above is used to form slider bond pads along the side faces of the slider. However, the slider bond pad molds are formed along the dice lanes substantially perpendicular to the slice lanes the wafer into slider bars. After the bond pads are fabricated as discussed above, the wafer is sliced into slider bars and then the bars are diced into individual sliders. The side slider bond pads are be exposed when the slider bars are diced into individual sliders, but, the slider bond pads are still fabricated at the wafer-level.

The present invention method for fabricating sliders having top surface slider bond pads or side slider bond pads is done at the wafer-level rather than at the bar-level. Thus, upwards of 30,000 sliders with bond pad features may be fabricated at once on the wafer rather than approximately 50 sliders with bond pad features at a time on a slider bar. Wafer-level fabrication of the slider bond pads is a more efficient and less costly than bar-level fabrication. In addition, the top surface placement of the slider bond pads permits easier alignment and connection between the slider bond pads and the FOS bond pads when attaching the slider to the gimbal. Top surface location of slider bond pads is beneficial for sliders including a transducer-level microactuator because the top surface provides a rigid, non-moving part for connecting the slider with the FOS bond pads. Side slider bond pads are used to connect the slider to FOS bonds at a stationery portion of the slider and provide additional contacts for use between the slider and other components in the disc drive actuation system.

Although the present invention has been described with reference to preferred embodiments, workers skilled in the art will recognize that changes may be made in form and detail without departing from the spirit and scope of the invention.

The invention claimed is:

1. A method for forming sliders, the method comprising:
   providing a substrate having a top surface;
   forming trenches in the substrate;
   filling the trenches with a bond pad material to form slider bond pads;
   removing excess bond pad material from the trenches so that the slider bond pads are flush with the top surface of the substrate;
   fabricating a transducer supported by the substrate such that the transducer is positioned on a trailing edge of the slider; and
   partitioning the substrate to expose the slider bond pads along a surface in addition to the top surface of the substrate.

2. The method of claim 1 wherein the trenches have a depth that defines a length of the slider bond pads.

3. The method of claim 1 wherein the forming trenches step comprises etching the trenches into the substrate with a deep reactive ion etching (DRIE) process.

4. The method of claim 3 wherein the substrate is a silicon wafer.

5. The method of claim 1 wherein the forming trenches step comprises:
   cutting a dicing lane partially into the substrate;
   backfilling the dicing lane with a spacer material; and
   patterning the spacer material to form the trenches.

6. The method of claim 5 wherein the substrate is AlTiC.

7. The method of claim 5 wherein the spacer material is photoresist. photoimagable epoxy, spin on glass, polysilicon, germanium, or another patternable or etchable material.

8. The method of claim 1 wherein the filling the trenches with the bond pad material step comprises:
   insulating the trenches with a first insulation layer;
   depositing a conductive seedlayer in the trenches;
   depositing a second insulation layer over the seedlayer;
   etching the second insulation layer to expose conductive surfaces in the trenches; and
   plating the bond pad material to form the slider bond pads.

9. The method of claim 8 wherein the removing excess bond pad material step comprises:
   removing the second insulation layer; and
   planarizing the conductive seedlayer to the first insulation layer.

10. The method of claim 1 wherein the filling the trenches with the bond pad material step comprises:
    insulating the trenches with a first insulation layer; and
    filling the trenches with the bond pad material by a method including, but not limited to, electroplating, blanket plating, selective plating, sputtering or chemical vapor deposition (CVD).

11. The method of claim 1 wherein the fabricating the transducer step comprises:
    depositing an insulation layer over the top surface of the substrate;
    etching electrical vias through the insulation layer; and
    depositing interconnect material in the electrical vias, the electrical via material creating an interconnect between the transducer and the slider bond pads.

12. The method of claim 1 wherein the exposing the slider bond pads step further comprises slicing the substrate into slider bars with a dicing wheel wherein dicing lanes expose the slider bond pads.

13. The method of claim 1 wherein the exposing the slider bond pads step further comprises:
    slicing the substrate into slider bars with a dicing wheel; and lapping the substrate along dicing lanes to expose the slider bond pads.

14. The method of claim 12 or 13, and further comprising dicing the slider bars into individual sliders.

15. The method of claim 1 wherein the exposing the slider bond pads step further comprises:
   slicing the substrate into slider bars with a dicing wheel; and
   dicing the slider bars into individual sliders to expose the slider bond pads.

16. A method of forming sliders, the method comprising:
   providing a substrate having a top surface;
   forming trenches in the top surface of the substrate such that they are exposed only at the top surface;
   filling the trenches with a bond pad material to form slider bond pads;
   planarizing the bond pad material to the top surface of the substrate;
   fabricating a transducer on the top surface, including interconnects between the transducer and the slider bond pads; and
   forming the substrate into a slider, the forming comprising:
      partitioning the substrate to expose the slider bond pads along a surface additional to a trailing edge surface of the slider and other than an air bearing surface of the slider, and such that the transducer is positioned on the trailing edge of the slider with access to the air bearing surface of the slider.

17. The method of claim 16 wherein the forming trenches step comprises etching the trenches into the substrate with a deep reactive ion etching (DRIE) process.

18. The method of claim 16 wherein the forming trenches step comprises:
   cutting a dicing lane partially into the substrate;
   backfilling the dicing lane with a spacer material; and
   patterning the spacer material to form the trenches.

19. The method of claim 18 wherein the substrate is AlTiC.

20. The method of 16 wherein the filling the trenches with the bond pad material step comprises:
   insulating the trenches with a first insulation layer;
   depositing a conductive seedlayer in the trenches;
   depositing a second insulation layer over the conductive seedlayer;
      etching the second insulation layer to expose conductive surfaces in the trenches; and
   plating the bond pad material to form the slider bond pads.

21. The method of claim 16 wherein the partitioning the substrate to expose the slider bond pads step further comprises slicing the substrate into slider bars wherein dicing lanes expose the slider bond pads.

22. The method of claim 16 wherein the partitioning the substrate to expose the slider bond pads step further comprises:
   slicing the substrate into slider bars along slicing lanes with a dicing wheel; and
   lapping the substrate along the slicing lanes to expose the slider bond pads.

* * * * *